June 23, 1931.    A. PROCOFIEFF-SEVERSKY    1,811,152
LANDING GEAR FOR AIRCRAFT
Filed July 24, 1926    5 Sheets-Sheet 1
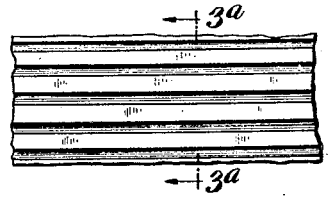
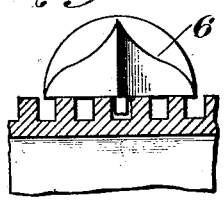
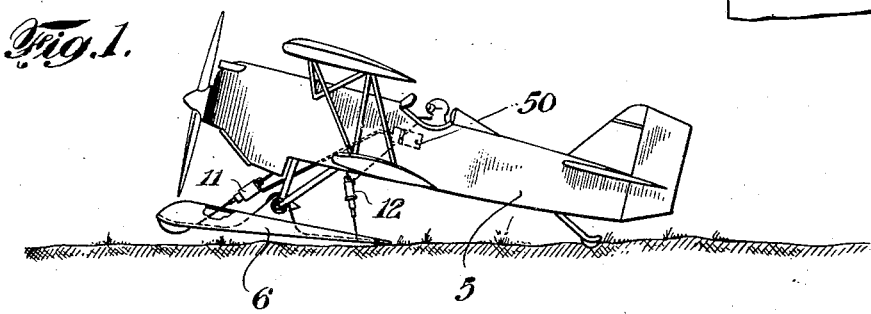
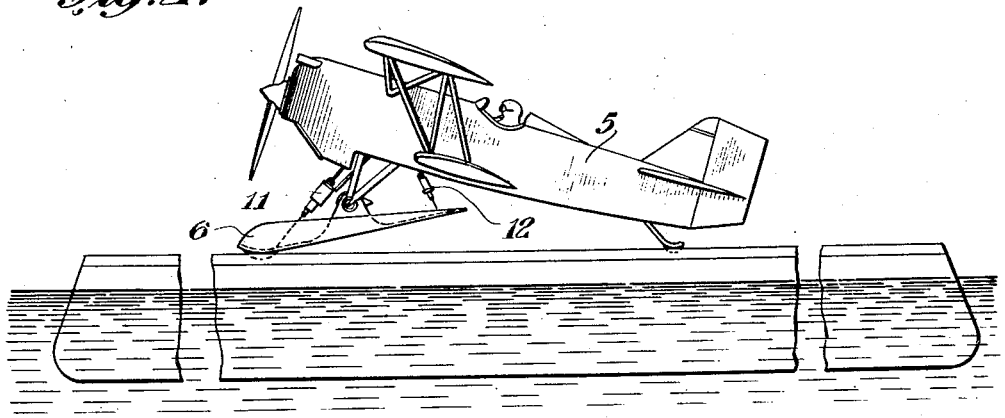
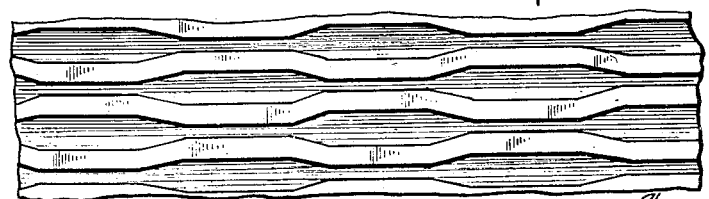
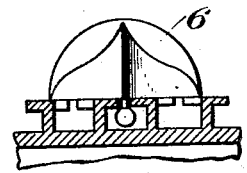
INVENTOR.
Alexander Procofieff-Seversky
BY
ATTORNEYS.

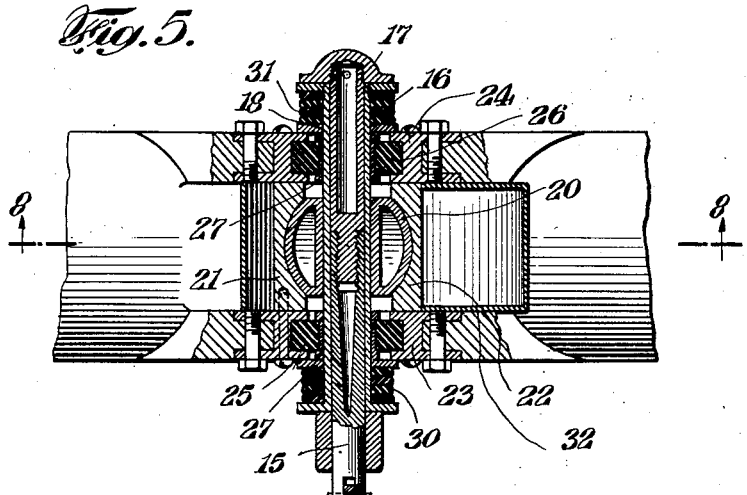
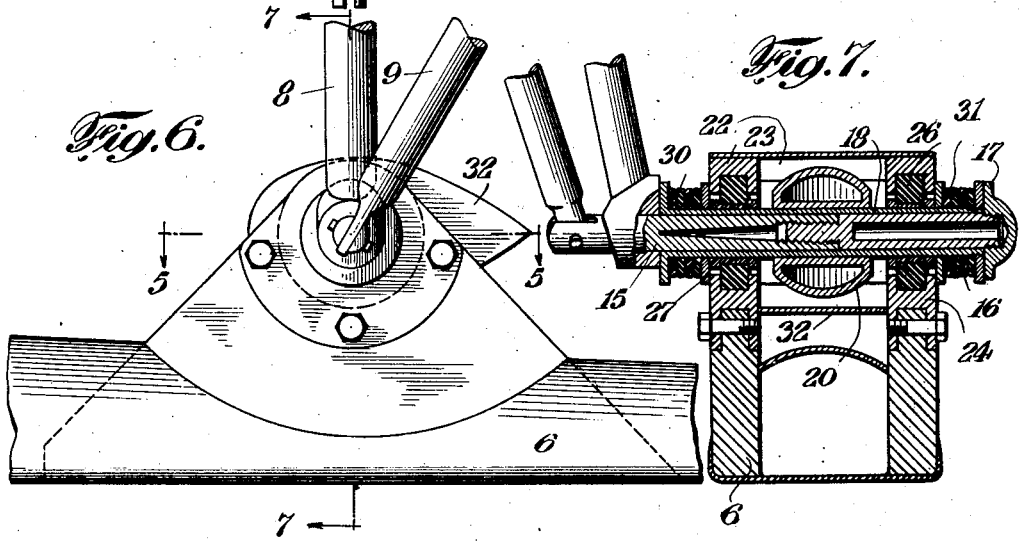
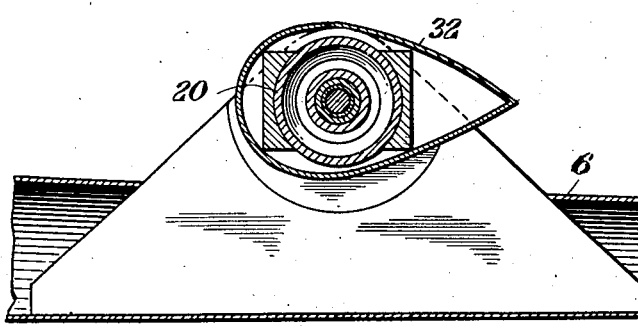

June 23, 1931.　　A. PROCOFIEFF-SEVERSKY　　1,811,152
LANDING GEAR FOR AIRCRAFT
Filed July 24, 1926　　5 Sheets-Sheet 3
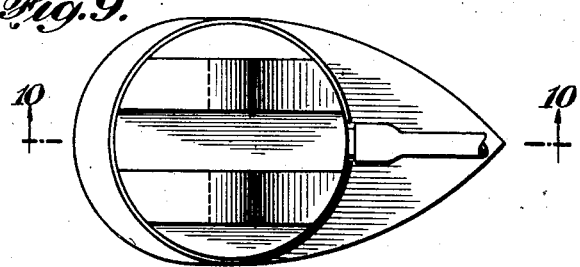
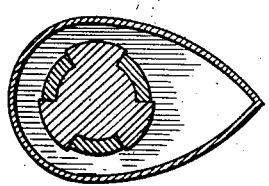
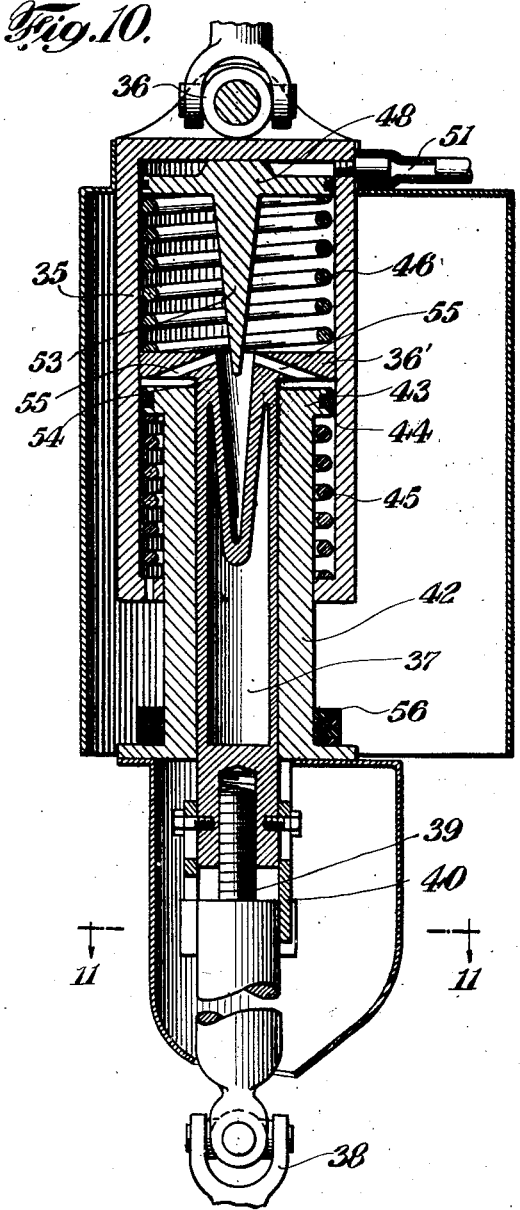
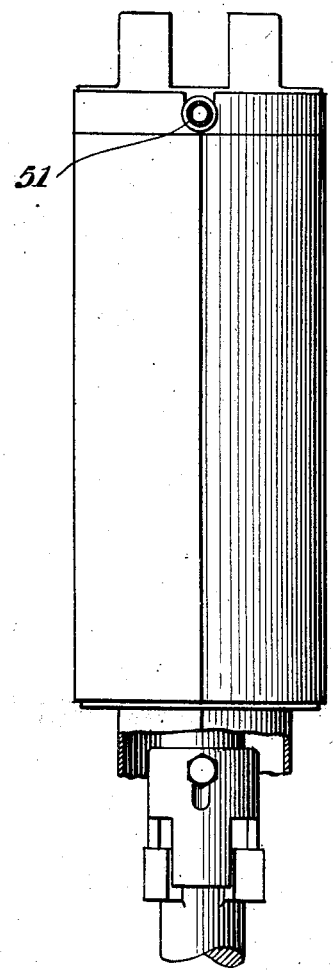
INVENTOR.
Alexander Procofieff-Seversky.
BY
Emery Booth, Janney Varney
ATTORNEYS.

June 23, 1931. A. PROCOFIEFF-SEVERSKY 1,811,152
LANDING GEAR FOR AIRCRAFT
Filed July 24, 1926 5 Sheets-Sheet 4
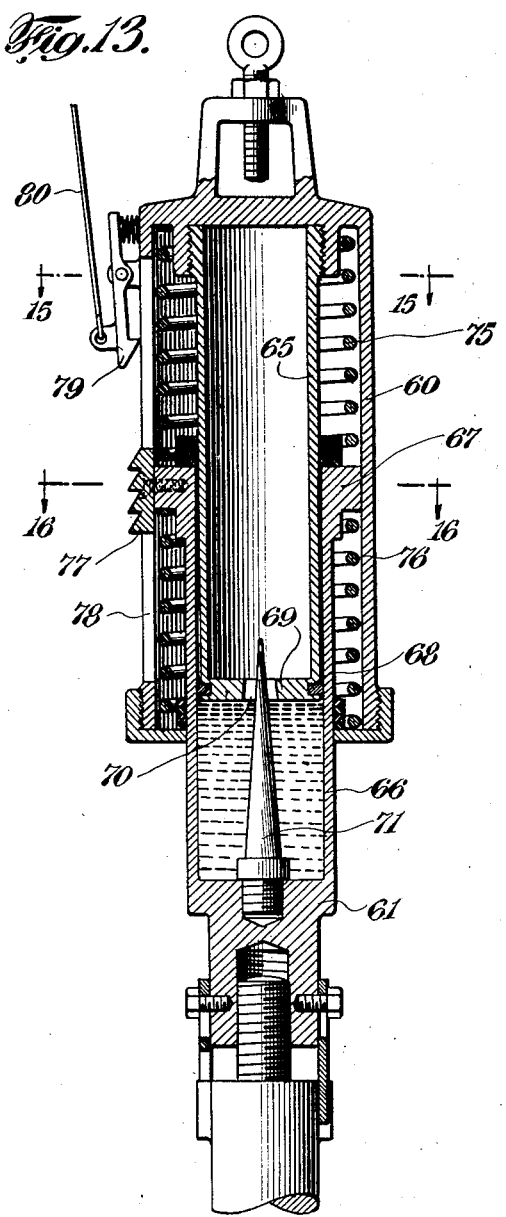
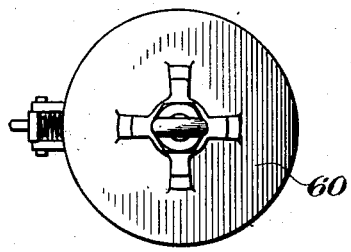
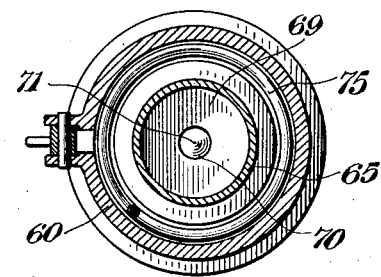
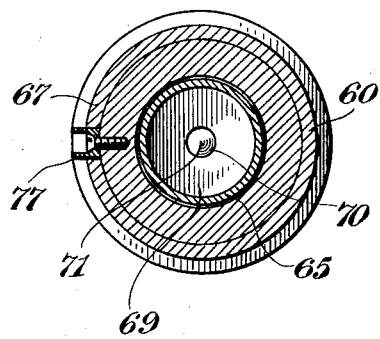
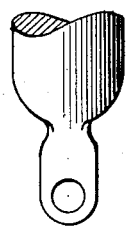
INVENTOR.
Alexander Procofieff-Seversky.
BY
ATTORNEYS.

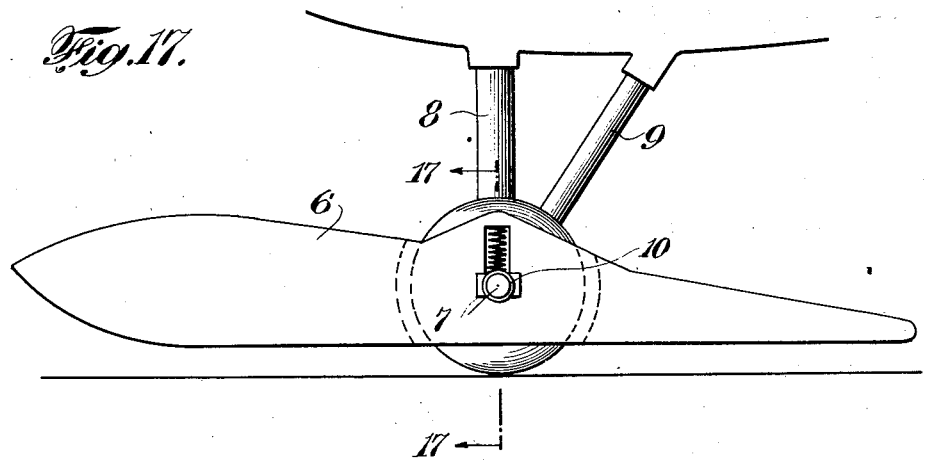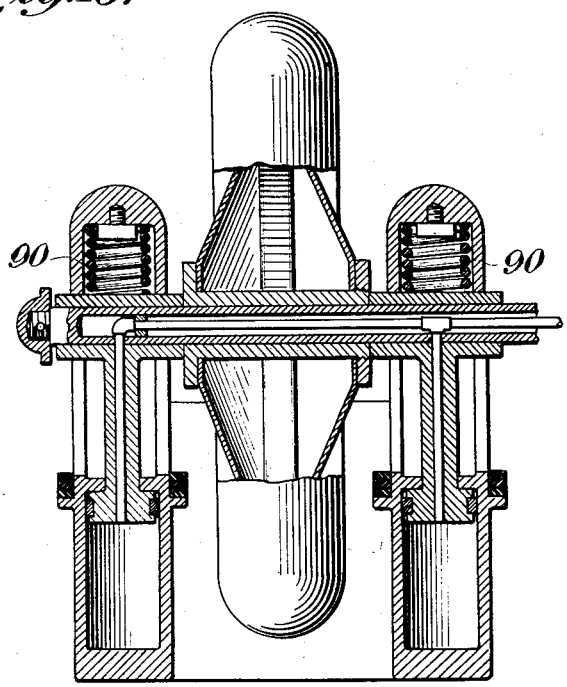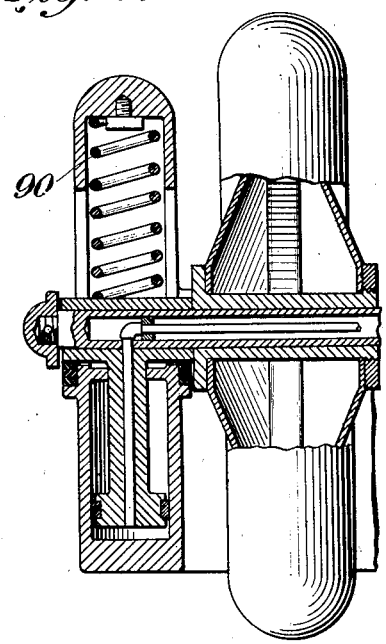

Patented June 23, 1931

1,811,152

UNITED STATES PATENT OFFICE

ALEXANDER PROCOFIEFF-SEVERSKY, OF NEW YORK, N. Y.

LANDING GEAR FOR AIRCRAFT

Application filed July 24, 1926. Serial No. 124,562.

The present invention relates to aircraft and has for an object to provide an improved landing gear, and improved landing area and an improved method of landing.

Landing gear for aircraft ordinarily provides for absorbing the shocks due to landing and yieldable means is provided for resisting and absorbing such shocks. When landing in cross winds, however, there are considerable lateral stresses. The present invention provides means for resisting and absorbing said lateral stresses.

The present invention provides, also, among other things, an effective shock absorbing means for yieldably resisting landing shocks to the landing gear of aircraft in which skids are used instead of wheels. The term "skids" is used herein to mean not only the more or less rigid skids used for landing on the ground but also includes the somewhat similar skids for landing on water more commonly referred to as pontoons, and tractors or the like. The landing shocks may be absorbed by pivotally connecting the skids to the frame work of the landing gear in a manner to cause one end of the skid to first engage upon landing and by providing yieldable means for resisting the pivotal movement of the skid which occurs upon landing.

The invention also provides improved means for landing an aircraft upon a limited area and a landing surface therefor.

The nature and objects of the invention will be better understood from a consideration of a particular illustrative embodiment thereof for the purpose of which description reference should be had to the accompanying drawings forming a part hereof and in which Figure 1 is a side view showing an aeroplane equipped with a landing gear embodying the principles of the invention showing the aeroplane landing on the ground.

Figure 2 is a similar view but showing the aeroplane landing on the landing platform constructed in accordance with the invention.

Figure 3 is a plan view of a landing platform.

Figure 3a is a sectional view of the same also showing the shape of the ski prow engageable therewith.

Figure 4 is a view similar to Figure 3 but showing another arrangement.

Figure 4a is a sectional view of the same showing also the ski ball engaging the platform.

Figure 5 is a horizontal sectional view showing the construction of the axle of the landing gear to which the ski is attached.

Figure 6 is a side view showing the connection between the ski and the aircraft.

Figure 7 is a vertical sectional view taken centrally of Figure 6.

Figure 8 is a vertical sectional view taken centrally of Figure 5.

Figure 9 is an end view of the forward shock absorbing member connecting the forward end of the ski to the aircraft.

Figure 10 is a central sectional view of said shock absorbing member or bumper.

Figure 11 is a sectional view taken on the line 11 of Figure 10.

Figure 12 is a view in rear elevation of the shock absorbing member.

Figure 13 is a central sectional view of the shock absorbing member or bumper connecting the rear portion of the ski to the air craft.

Figure 14 is an end view of the rear shock absorbing member shown in Figure 13.

Figures 15 and 16 are sectional views taken respectively on the lines 15—15 and 16—16 of Figure 13.

Figure 17 is a side view of a construction providing both wheels and skis for alternative use. The ski in this case is shown as a pontoon.

Figure 18 is a sectional view taken centrally on Figure 17.

Figure 19 is a similar sectional view but showing the pontoons elevated to permit engagement of the wheel with the ground.

The construction shown in the drawings for the purpose of illustrating the invention is a landing gear arranged to be used for landing either on the ground or on a 1⁰⁰ specially constructed surface which may be the deck of a vessel or the top of a building or the like. The landing platform should, preferably, be rotatable to permit flying into the wind when landing. If mounted on a vessel it may, if desired, be stabilized to maintain the surface horizontal during the roll of the vessel. This can be accomplished by gyroscopically controlled means including follow-up motors for tilting the platform relative to the vessel. The platform surface and ski may be simply corrugated to prevent side slip or more complete interengaging means may be provided.

The landing gear shown comprises a ski or pair of skis which may be skids, pontoons, tractors or other equivalent ground engaging members pivotally connected to the aircraft together with means for resisting pivotal movement of the ski relative to the craft. Provision is made for resisting pivotal movement of each ski about its axis of support in order to absorb the landing shocks. The arrangement is such that when landing upon the ground the ski can be so positioned that the rear end of the ski will first engage the ground and when landing upon a specially constructed surface, the ski can be so positioned that the forward end thereof will first engage the landing surface. In either case as the weight of the plane is taken by the ski the ski will be moved about its axis of support against the resisting means to a substantially horizontal ground engaging position. Provision is also made that when the aircraft is in flight the skis can be placed in flying position of minimum air resistance and they will tend to maintain such position.

Referring more particularly to the construction shown in the drawings the aeroplane 5 is provided with skis 6 pivotally secured as at 7 to struts 8 and 9 forming a part of the landing gear and secured to the under part of the aircraft.

Pivotal movement of the ski about the axle 10 on which it is mounted is resisted by a forward shock absorbing element or buffer 11 and a rear shock absorbing element or buffer 12. It will be noticed that if desired one or the other of these shock absorbing elements may be omitted in practice and the remaining one may be constructed to serve all purposes. The shock absorbing elements serve to hold the ski in substantially horizontal position during flight in order that it may afford as little resistance as possible to flight but when it is desired to land they are operated to move the ski pivotally in a vertical plane to desired position in order to position either the rear end of the ski for engagement with the ground or the forward end of the ski for engagement with the specially constructed landing surface.

The connection between the ski and the axle is such as to permit the desired pivotal movement in the vertical plane and to allow a limited pivotal movement transversely to the vertical plane and also a limited bodily movement laterally, the lateral pivotal movement and the lateral bodily movement being resisted by suitable shock absorbing means.

In the construction particularly shown in Figure 5 the ski is connected to the usual axle 15 ordinarily provided on landing gear of aeroplanes and on which the landing wheel is ordinarily mounted. The hollow end of the axle 15 is threaded to receive an extension member 16 provided with a cap nut 17 on the outer end thereof. A sleeve 18 fits over the axle 15 and extension 16 and this sleeve is rotatably mounted on a spherically bearing member 20 which in turn may slide on the sleeve. The hub structure of the ski 6 comprises spherically bearing members 21 and 22 rigidly secured between the outer metal hub members 23 and 24 engaging opposite faces of the spherical bearing member 20.

Lateral pivotal movement of the ski 6 either about a horizontal or a vertical axis is resisted by means of rubber buffer members 25 and 26 which buffer members are preferably annular and engage annular recesses in the hub members 23 and 24. They are preferably mounted in annular metal rings 27 which are slidably and rotatably mounted on the central bearing sleeve 18. Lateral movement of the ski and the hub structure, that is to say, movement longitudinally along the axle on the sleeve 18 is resisted at both ends of the hub structure by similar resilient rubber buffer rings 30, 31.

The described arrangement permits free pivotal movement of the ski 6 in a vertical plane about the axle 15, 16 and also permits a limited angular movement of the ski preferably in all directions laterally with respect to a vertical plane, such movement however being resisted by resilient buffer elements. This accomplishes several objects. It provides for yieldingly resisting lateral stresses and facilitates turning of the craft. For example, when travelling on snow on snow skis, the skis tilt and facilitate turning as in the case of skiing on foot. Special means for positively tilting the skis for turning may be provided if desired. The central part of the hub structure is preferably enclosed in a stream line casing 32 to lessen the wind resistance.

The forward shock absorbing element 8 is arranged normally to hold the ski in horizontal position but it may be operated to tilt the forward end of the ski downwardly and then yieldably resist any upward movement of said forward end of the ski to absorb the shocks in landing.

The structure shown for the purpose of illustrating the invention comprises a cylinder 35 arranged to be pivotally connected at its upper end as indicated at 36 to the framework to the aircraft. Within this cylinder is a piston 36' formed at the upper end of a plunger rod 37 which rod is arranged to be pivotally connected to the ski as indicated at 38.

The rod may be made of adjustable length as by means of the threaded connection indicated at 39 with the locking sleeve 40 operable to hold the threaded connection in adjusted position.

The rod 37 operates through a sleeve 42 which sleeve is formed at its upper end with a head 43 movable in the cylinder 35, a suitable packing 44 being provided to prevent leakage of the fluids past this head. The sleeve 42 is urged upwardly in the cylinder 35 by means of a spring 45. The piston 36' is urged downwardly by means of a spring 46 which may be of substantially the same strength as the spring 45 or it may be formed to afford a greater resistance to upward movement of the piston 36' than the resistance offered by the spring 45 to a downward movement of the head 43 and piston 36'. In any event the springs 45, 46 are preferably so constructed and arranged as to hold the piston 36' in substantially mid position in the cylinder 35. A controlled piston 48 is movable within the upper end of the cylinder 35 and means is provided such, for example, as the pump 50, under control of the operator for forcing said piston downwardly to extend the rod 37 and thus tilt downwardly the forward end of the ski for the purpose of landing.

As fluid is forced into the upper end of the cylinder 35 behind the piston 48 as, for example, through the inlet 51. The piston 36' and rod 37 are forced downwardly against the resistance of the spring 45 thus tilting the ski downwardly.

The fluid used behind the piston 48 may be either a compressible or incompressible fluid and if desired it may be controlled by a valve in the inlet 51. If a compressible fluid is used then said compressible fluid may assist in absorbing the shocks of landing.

The valve 48 may be provided with a tapered valve projection 53 which serves to close the opening 54 leading to the passages 55 through the piston head 36'. By this arrangement the opening 54 will be gradually closed during the compression of the shock absorber upon landing thus offering gradually increasing resistance to the landing shocks.

The operation of the shock absorbing element is as follows: Before landing, fluid is pumped into the space above the piston 48 to force the rod 37 downwardly thereby tilting the ski downwardly at its forward end. As the forward end of the ski engages the landing surface and is forced upwardly by the impact the piston 36' moves upwardly against the spring 46 and against the fluid in the cylinder. If the cylinder is filled with an incompressible fluid then said fluid will be forced through the opening 54 and passages 55 to the space below the piston 36' and this fluid will in turn force downwardly the head 43 against the action of the spring 45. The landing shocks will, therefore, be resisted by both springs 45 and 46 and by the fluid in the cylinder 35, flowing through the restricted passages 54 and 55.

Preferably yieldable buffer members 56 are provided for engagement by the end of the cylinder 35 when the rod 37 and cylinder 35 are compressed to the extreme limit.

The rear shock absorbing mechanism as best shown in Figure 13 comprises a double-walled cylinder 60 and a rod 61 movable therein. The opposite ends of this shock absorber as in the case of the forward shock absorber are arranged to be connected to the aircraft and to the rear portion of the ski by universal joints.

The inner wall of the double-walled cylinder 60 is formed by a cylinder member 65 which is threaded to a suitable boss of the main casting of the cylinder 60.

The upper end of the rod 61 is formed to provide a cylinder 66 having a chamber which receives the cylinder 65 the cylinder 66 being formed at its upper end with a head 67 which is received between the walls of the double-walled cylinder 60. The point between the inner wall, i. e. the cylinder 65, and the cylinder 66, is preferably made fluid tight as by means of packing 68. The head 69 of the cylinder 65 is provided with a restricted passage 70 which in turn is closed by an upper valve member 71 carried by the rod 66 and arranged gradually to close said restricted passage as the shock absorber is contracted upon landing.

The head 67 normally is urged to central position longitudinally of the cylinder 60 by means of springs 75 and 76 engaging opposite faces thereof and housed within the cylinder 60.

A rack or grid member 77 is secured to the head 67 and projects through a slot 78 in the double-walled cylinder.

This rack is arranged to be engaged by a hook 79 to prevent reverse movement of the skis after they have been moved in landing. The spring 76 is so designed that when plane engages the ground or other landing surface the weight of the tail of the plane presses the spring 76, so that the tail of the plane rests on the ground by its tail skid. In other words, spring 76 is slightly weaker than the weight of the tail, so that the shock during the landing is primarily absorbed by the oil, but as the friction between the skis and the ground may be too great and therefore the speed of the craft may be reduced too suddenly and as the center of gravity of aircraft is considerably higher than the pivotal connection of the skis, the aircraft will tend to rotate around the ski axle. It is for this reason that the rack and the hook are provided so that at the moment of landing the tail of the plane will be, in effect, rigidly connected with the ski in its lowest position, and if then the aircraft has a tendency to overturn it will not be able to rotate around the axle but will have to rotate around the extreme front tip of the ski. Naturally under this condition the resisting pitching momentum of the aircraft is very much greater, and in order to overturn the aircraft under this condition the force applied would be so great that it would break the landing gear before it could overturn the aircraft. The hook may also be used to hold the skis in normal horizontal position during flight. A tension member 80 being connected to said hook to facilitate release of the hook by the pilot when it is desired to land and to move the skis to the ngular position with the rear end down ior landing on the ground. The hook should, of course, be held out of engaging position when landing with the forward end of the skis down as heretofore described.

It will be understood that the two shock absorbing devices, if both are used simultaneously, should be suitably coordinated in order that neither will interfere with the operation of the other. This, however, can be easily managed as will be readily understood.

If the forward end of the ski is tilted downwardly for landing then the rear shock absorber will be merely compressed a part of its compressible distance and in this position no undue resistance is offered to the desired operation of the skis. On the other hand if the rear end of the ski is tilted downwardly the forward shock absorber will be compressed a part of its compressible distance but this will not offer any undue resistance to the desired operation of the device.

The shock absorbing member shown as used at the forward end of the ski may also be used alternatively at the rear of the ski. The operation of this device to increase the angle of the ski would obviously be effective in such use as well as in the use more particularly described.

If desired the point of attachment of the upper end of each of the shock absorbing elements may be made adjustable relative to the aircraft for the purpose of controlling the angular position of the ski thus controlled.

In the construction shown in Figures 17, 18 and 19 the ski which may be a pontoon, tractor or any other desired form of ski is combined with a wheel, the pontoon being made adjustable vertically to permit the wheel to come in contact with the ground. As shown in Figure 18, hydraulic means is provided for forcing the ski down below the lower edge of the wheel and springs 90 are shown for elevating said ski. The arrangement is such that the pilot can very comfortably and gradually, by operating a lever or a pedal, transfer the weight from the plane to the ski or pontoon, or from the ski and pontoon to the wheel. Such an arrangement makes a very effective braking device.

It will be understood that in addition to the shock absorbing means illustrated additional shock absorber elements may be provided in the landing gear between the axle and the aircraft.

I claim:

1. In landing gear for aircraft, the combination with an axle, of an extension member arranged to be connected to said axle, a ground engaging member mounted on the axle and extension to permit relative angular movement and longitudinal movement.

2. Landing gear for aircraft adapted to enable an aircraft to land upon a surface having parallel tracks comprising in combination a downwardly projecting element carried by the aircraft arranged to engage said tracks to guide the aircraft, and means for yieldably resisting lateral movement of said downwardly projecting element relative to the aircraft.

3. In a landing surface for aircraft, a surface comprising a series of parallel tracks having overlying flanges engageable with means carried by the aircraft and having spaced widened areas between said tracks to facilitate engagement of the means.

4. In a landing gear for aircraft a pivotally movable ground engaging skid, yieldable means resisting pivotal movement in one direction and locking means operable to resist reverse pivotal movement of said element.

5. Landing gear for aircraft comprising a ground engaging skid pivotally connected to an aircraft for pivotal movement in a vertical plane, means for moving said skid angularly to cause either its forward or rear end to engage the ground, yieldable means for resisting upward movement of said end arranged to absorb the shock of landing, comprising a fluid dashpot, and means including a pump for moving said skid in either direction about its point of support.

6. Landing gear for aircraft comprising a ground engaging skid arranged to be pivotally connected to an aircraft, said skid being provided with a downwardly projecting guiding means at the forward end thereof arranged to engage a track to guide the air-plane when landing, said skid being arranged to yield until it engages the ground throughout substantially its full length, substantially as described.

7. In a landing gear for aircraft, the combination with an axle of usual construction of an extension member arranged to be secured to said axle to in effect extend the length thereof, a ground engaging member mounted on said axle and on the extension thereof to permit relative angular movement and longitudinal movement on said axle and extension member as a unit.

In testimony whereof, I have signed my name to this specification this 22nd day of July, 1926.

ALEXANDER PROCOFIEFF-SEVERSKY.